(12) United States Patent
Xie

(10) Patent No.: US 11,550,294 B2
(45) Date of Patent: Jan. 10, 2023

(54) AUTOMATIC DIAGNOSIS METHOD AND SYSTEM FOR THREAD TURNING, DATA PROCESSING SYSTEM AND STORAGE MEDIUM

(71) Applicant: Siemens Aktiengesellschaft, Munich (DE)

(72) Inventor: Chong Min Xie, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/041,055

(22) PCT Filed: Mar. 26, 2018

(86) PCT No.: PCT/CN2018/080561
§ 371 (c)(1),
(2) Date: Sep. 24, 2020

(87) PCT Pub. No.: WO2019/183777
PCT Pub. Date: Oct. 3, 2019

(65) Prior Publication Data
US 2021/0096533 A1 Apr. 1, 2021

(51) Int. Cl.
*G05B 19/4065* (2006.01)
*G05B 19/18* (2006.01)
*G05B 19/404* (2006.01)

(52) U.S. Cl.
CPC ....... *G05B 19/4065* (2013.01); *G05B 19/186* (2013.01); *G05B 19/404* (2013.01)

(58) Field of Classification Search
CPC .............. G05B 19/4065; G05B 19/186; G05B 19/404; G05B 2219/36204;
(Continued)

(56) References Cited

U.S. PATENT DOCUMENTS 7,039,493 B2  5/2006 Endou et al.
2004/0128018 A1*  7/2004 Sugie ................... G05B 19/182
                                                    700/160

(Continued)

FOREIGN PATENT DOCUMENTS

CN      1892523 A    1/2007
CN    102640066 A    8/2012
(Continued)

OTHER PUBLICATIONS

Wei, Zhang: "Machining Error Distribution Characteristics in Turning Large Pitch Thread and its Process Design Method"; Master Thesis; Harbin University of Science and Technology; CN; Mar. 2017; pp. 1-101; 2017.

(Continued)

*Primary Examiner* — Kenneth M Lo
*Assistant Examiner* — Mohammed Shafayet
(74) *Attorney, Agent, or Firm* — Harness, Dickey & Pierce, P.L.C.

(57) ABSTRACT

A turning thread automatic diagnosing method includes collecting a spindle actual speed and a feeding shaft actual speed of a lathe; based upon the spindle actual speed and the feeding shaft actual speed, continuously calculating thread errors to obtain a thread error curve; and analyzing an error cause according to the thread error curve. In addition, a turning thread automatic diagnosing system is disclosed, using the method. A data processing system and a storage medium are also disclosed. The technology of the embodiments can automatically identify the problem causing a thread error and provide a corresponding solution.

16 Claims, 5 Drawing Sheets

(58) Field of Classification Search
CPC ........... G05B 2219/33285; G05B 2219/33309; G05B 2219/45215; G05B 19/406; B23G 1/02
USPC ........................................................ 700/193
See application file for complete search history.

(56) References Cited

U.S. PATENT DOCUMENTS

| | | | |
|---|---|---|---|
| 2007/0007926 A1 | 1/2007 | Iwashita | |
| 2011/0164244 A1* | 7/2011 | Honda | G01B 11/2433 356/72 |
| 2012/0283851 A1* | 11/2012 | Yamamoto | G05B 19/404 700/56 |
| 2013/0039707 A1* | 2/2013 | Takayama | B23G 1/18 408/9 |
| 2015/0081084 A1* | 3/2015 | Nishiwaki | G05B 19/402 700/170 |
| 2016/0357171 A1* | 12/2016 | Morita | G05B 19/4141 700/188 |

FOREIGN PATENT DOCUMENTS

| | | |
|---|---|---|
| CN | 102922059 A | 2/2013 |
| CN | 104380218 A | 2/2015 |
| CN | 106239257 A | 12/2016 |
| EP | 1742128 A1 | 1/2007 |
| WO | WO-2017113055 A1 | 7/2017 |

OTHER PUBLICATIONS

Office Action for Chinese Patent Application No. 201880081304.1 dated May 27, 2021.
Extended European Search Report for European Patent Application No. 18913057.8 dated Sep. 15, 2021.
European Office Action for European Patent Application No. 18913057.8 dated Jul. 13, 2022.

* cited by examiner

AUTOMATIC DIAGNOSIS METHOD AND SYSTEM FOR THREAD TURNING, DATA PROCESSING SYSTEM AND STORAGE MEDIUM

PRIORITY STATEMENT

This application is the national phase under 35 U.S.C. § 371 of PCT International Application No. PCTCN2018/080561 which has an International filing date of Mar. 26, 2018, which designated the United States of America, the entire contents of which are hereby incorporated by reference herein, in their entirety and for all purposes.

FIELD

Embodiments of the present invention generally relate to a field of machining, in particular to an automatic diagnosis method and system for thread turning, a data processing system and a storage medium.

BACKGROUND

Problems such as thread pitch error often arise in the turning of threads on machine tool equipment. A user or maintenance engineer will sometimes find it difficult to find the root of the problem, or find it difficult to adjust the machine tool equipment to optimum parameters within a short time in order to obtain a thread of satisfactory quality.

SUMMARY

At least one embodiment of the present invention is intended to provide an automatic diagnosis technique for thread turning. The method or system of at least one embodiment of the present invention may be integrated in a CNC machine tool, to automatically identify and diagnose the fundamental cause of thread cutting faults, and provide the user or maintenance engineer with a solution to the problem or automatically implement this solution, in order to obtain ideal thread cutting quality.

According to one embodiment of the present invention, an automatic diagnosis method for thread turning is provided, comprising:

acquiring a main shaft actual speed and a feed shaft actual speed of a lathe;

continuously computing a thread error based upon the main shaft actual speed and feed shaft actual speed, to obtain a thread error curve; and analyzing an error cause according to the thread error curve.

According to another embodiment of the present invention, an automatic diagnosis system for thread turning is provided, comprising:

a data acquisition unit, for acquiring a main shaft actual speed and a feed shaft actual speed of a lathe;

a data processing unit, for continuously computing a thread error based upon the main shaft actual speed and feed shaft actual speed from the data acquisition unit, to obtain a thread error curve; and a diagnosis unit, for analyzing an error cause according to the thread error curve from the data processing unit.

According to another embodiment of the present invention, a data processing system is provided, comprising:

one or more processors;

a memory; and one or more programs, stored in the memory and configured to be executed by the one or more processors, the one or more programs comprising an instruction for executing the method as discussed in at least one embodiment.

According to another embodiment of the present invention, a storage medium is provided, having stored therein one or more programs comprising an instruction which, when executed by a data processing system, causes the data processing system to execute the method as discussed in at least one embodiment.

BRIEF DESCRIPTION OF THE DRAWINGS

The drawings are included to provide further understanding of the present invention; they are recorded and form part of the present application. The drawings show embodiments of the present invention, and together with this specification serve to explain the principles of the present invention. In the drawings.

Figure 1:
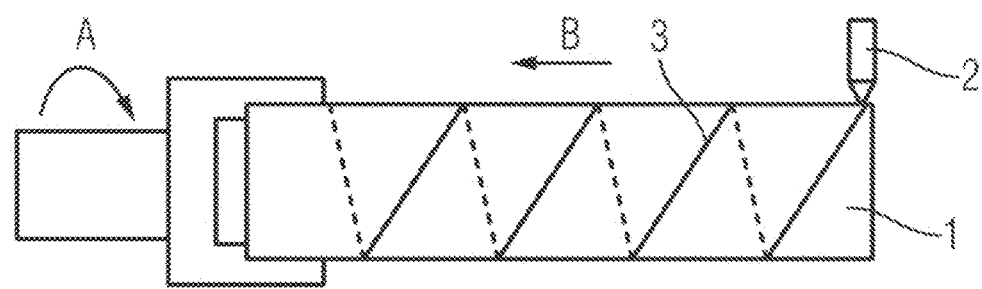
FIG. 1 shows a schematic diagram of the principles of thread turning.

Key to labels used in the drawings:
1 workpiece
2 cutting tool
3 thread

DETAILED DESCRIPTION OF THE EXAMPLE EMBODIMENTS

According to one embodiment of the present invention, an automatic diagnosis method for thread turning is provided, comprising:

acquiring a main shaft actual speed and a feed shaft actual speed of a lathe;

continuously computing a thread error based upon the main shaft actual speed and feed shaft actual speed, to obtain a thread error curve; and analyzing an error cause according to the thread error curve.

According to an embodiment of the present invention, in the automatic diagnosis method for thread turning, the step of continuously computing a thread error further comprises:

computing a feed shaft theoretical speed based upon the main shaft actual speed;

computing the thread error by comparing the feed shaft actual speed with the feed shaft theoretical speed.

According to an embodiment of the present invention, in the automatic diagnosis method for thread turning, the main shaft actual speed and feed shaft actual speed are acquired once at intervals of a preset time period, and the feed shaft actual speed and feed shaft theoretical speed obtained in the same acquisition are compared in step b2.

According to an embodiment of the present invention, in the automatic diagnosis method for thread turning, the preset time period is in the range of 4 ms-12 ms.

According to an embodiment of the present invention, in the automatic diagnosis method for thread turning, the thread error is computed according to the following equation:

$$E\_thread = (V\_act.sp * L\_pitch - V\_act.feed)/60 * T\_ipo$$

wherein E_thread denotes the thread error, V_act.sp denotes the main shaft actual speed, L_pitch denotes a preset thread pitch, V_act.feed denotes the feed shaft actual speed, and T_ipo denotes the preset time period.

According to an embodiment of the present invention, in the automatic diagnosis method for thread turning, the step of analyzing an error cause comprises: analyzing and determining an error cause according to a graphic form of the thread error curve.

According to an embodiment of the present invention, in the automatic diagnosis method for thread turning, the graphic form of the thread error curve at least comprises:

a first graphic form, having a characteristic whereby fluctuation of a starting segment in the thread error curve is greater than overall fluctuation of the thread error curve;

a second graphic form, having a characteristic whereby the overall fluctuation of the thread error curve is greater than a preset fluctuation range.

According to an embodiment of the present invention, in the automatic diagnosis method for thread turning, the error cause corresponding to the first graphic form is that a machined thread depth value is set too high, and the error cause corresponding to the second graphic form is that an optimization mode has not been enabled.

According to an embodiment of the present invention, the automatic diagnosis method for thread turning further comprises the following after the step of analyzing an error cause:

selecting and implementing a corresponding solution according to the error cause.

According to an embodiment of the present invention, in the automatic diagnosis method for thread turning, the solution for the error cause corresponding to the first graphic form comprises: automatically implementing or prompting an increase in the number of times cutting is performed, and/or automatically implementing or prompting a reduction in the machined thread depth value;

the solution for the error cause corresponding to the second graphic form comprises: automatically implementing or prompting the activation of a shaft state optimization mode.

According to another embodiment of the present invention, an automatic diagnosis system for thread turning is provided, comprising:

a data acquisition unit, for acquiring a main shaft actual speed and a feed shaft actual speed of a lathe;

a data processing unit, for continuously computing a thread error based upon the main shaft actual speed and feed shaft actual speed from the data acquisition unit, to obtain a thread error curve; and a diagnosis unit, for analyzing an error cause according to the thread error curve from the data processing unit.

According to an embodiment of the present invention, in the automatic diagnosis system for thread turning, the data processing unit computes a feed shaft theoretical speed based upon the main shaft actual speed, and computes the thread error by comparing the feed shaft actual speed with the feed shaft theoretical speed.

According to an embodiment of the present invention, in the automatic diagnosis system for thread turning, the data acquisition unit acquires the main shaft actual speed and feed shaft actual speed once at intervals of a preset time period, and the data processing unit compares the feed shaft actual speed and feed shaft theoretical speed obtained in the same acquisition.

According to an embodiment of the present invention, in the automatic diagnosis system for thread turning, the data processing unit computes the thread error according to the following equation:

$$E\_thread = (V\_act.sp * L\_pitch - V\_act.feed) / 60 * T\_ipo$$

wherein E_thread denotes the thread error, V_act.sp denotes the main shaft actual speed, L_pitch denotes a preset thread pitch, V_act.feed denotes the feed shaft actual speed, and T_ipo denotes the preset time period.

According to an embodiment of the present invention, in the automatic diagnosis system for thread turning, the diagnosis unit analyses and determines an error cause according to a graphic form of the thread error curve.

According to an embodiment of the present invention, in the automatic diagnosis system for thread turning, the graphic form of the thread error curve at least comprises:

a first graphic form, having a characteristic whereby fluctuation of a starting segment in the thread error curve is greater than overall fluctuation of the thread error curve;

a second graphic form, having a characteristic whereby the overall fluctuation of the thread error curve is greater than a preset fluctuation range.

According to an embodiment of the present invention, in the automatic diagnosis system for thread turning, the error cause corresponding to the first graphic form is that a machined thread depth value is set too high, and the error cause corresponding to the second graphic form is that an optimization mode has not been enabled.

According to an embodiment of the present invention, in the automatic diagnosis system for thread turning, the diagnosis unit selects and implements a corresponding solution according to the error cause.

According to an embodiment of the present invention, in the automatic diagnosis system for thread turning, the solution for the error cause corresponding to the first graphic form comprises: automatically implementing or prompting an increase in the number of times cutting is performed, and/or automatically implementing or prompting a reduction in the machined thread depth value;

the solution for the error cause corresponding to the second graphic form comprises: automatically implementing or prompting the activation of a shaft state optimization mode.

According to another embodiment of the present invention, a data processing system is provided, comprising:

one or more processors;

a memory; and one or more programs, stored in the memory and configured to be executed by the one or more processors, the one or more programs comprising an instruction for executing the method as discussed in at least one embodiment.

According to another embodiment of the present invention, a storage medium is provided, having stored therein one or more programs comprising an instruction which, when executed by a data processing system, causes the data processing system to execute the method as discussed in at least one embodiment.

It should be understood that the general description above and detailed description below of the present invention are demonstrative and illustrative, and intended to provide further explanation of the present invention as described in the claims.

Embodiments of the present invention will now be described, referring to the drawings in detail. Preferred embodiments of the present invention will now be referred to in detail; examples thereof are shown in the drawings. Wherever possible, identical labels will be used to represent identical or similar parts in all of the drawings. In addition, although the terms used in the present invention are selected from well known terms in common use, certain terms mentioned herein might be selected by the applicant according to his or her judgment, and the detailed meanings thereof are explained in the relevant parts of the description herein. In addition, the present invention must be understood not just through the actual terms used but also through the meaning contained in each term.

The basic principles and preferred embodiments of the present invention are discussed in greater detail with reference to the drawings.

FIG. 1 shows a schematic diagram of the principles of thread turning. During machining, a workpiece 1 being machined rotates around direction A under the driving action of a main shaft motor, while a cutting tool 2 advances along a feed shaft (direction B in FIG. 1), in order to turn a thread 3 on the workpiece 1 using the cutting tool 2.

Figure 2:
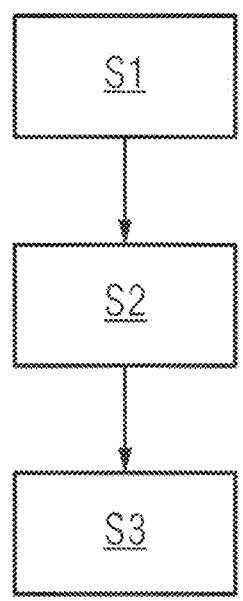
FIG. 2 shows a flow chart of an embodiment of the automatic diagnosis method for thread turning according to the present invention.

According to FIG. 2, the automatic diagnosis method for thread turning of the present invention mainly comprises: acquiring a main shaft actual speed and a feed shaft actual speed of a lathe (step S1); continuously computing a thread error based upon the main shaft actual speed and feed shaft actual speed, to obtain a thread error curve (step S2); and analyzing an error cause according to the thread error curve (step S3). The automatic diagnosis method for thread turning may be integrated in a CNC control unit, to automatically identify the cause of thread cutting faults, in order to guide a user or maintenance engineer to accurately adjust relevant parameters, e.g. machining data, drive data and cutting data, to finally obtain satisfactory thread cutting quality. The method of the present invention can be realized without adding hardware equipment to a CNC system.

The main shaft actual speed and feed shaft actual speed acquired in the above method are parameters that can be obtained in an existing CNC control unit. The thread error can be computed by comparing these two parameters. For example, in one example, the step S2 of continuously computing a thread error is specifically implemented as follows: first computing a feed shaft theoretical speed based upon the main shaft actual speed; and then computing the thread error by comparing the feed shaft actual speed with the feed shaft theoretical speed. In theory, in order to obtain a desired thread result, once the thread pitch has been set, the feed shaft speed must be synchronized with the main shaft speed, i.e. there is a fixed following relationship. Thus, the feed shaft theoretical speed that is theoretically required in order to obtain the required thread pitch (or satisfy the abovementioned synchronous relationship) can be calculated according to the actual speed of the main shaft. Then, by computing the difference between the feed shaft theoretical speed and feed shaft actual speed, the thread error can be further calculated.

For example, the thread error can be computed according to the following equation:

$$E\_thread = (V\_act.sp * L\_pitch - V\_act.feed)/60 * T\_ipo$$

wherein E_thread denotes the thread error, V_act.sp denotes the main shaft actual speed, L_pitch denotes a preset thread pitch, V_act.feed denotes the feed shaft actual speed, and T_ipo denotes a preset time period. The main shaft actual speed and feed shaft actual speed are acquired once at intervals of the preset time period (e.g. the preset time period is in the range of 4 ms-12 ms). For example, table 1 below shows an example of computation based upon the above equation; in this example, the preset time period is set to 8 MS.

TABLE 1

| T_ipo | V_act.sp | V_act.feed | Point error | Thread error |
|---|---|---|---|---|
| 8.96 | 200.134277 | −4514.779785 | −0.001567807 | −0.001567807 |
| 8.968 | 200.317383 | −4514.007813 | −0.000915559 | −0.002483366 |
| 8.976 | 200.317383 | −4502.763672 | 0.000583659 | −0.001899707 |
| 8.984 | 199.951172 | −4511.361616 | −0.001728059 | −0.003627768 |
| 8.992 | 200.134277 | −4510.488281 | −0.000995606 | −0.004623373 |
| 9 | 199.951172 | −4499.158691 | −3.43095E−05 | −0.004657682 |
| 9.008 | 199.951172 | −4508.51416 | −0.001281705 | −0.005939388 |
| 9.016 | 199.951172 | −4501.21875 | −0.000308984 | −0.006248372 |
| 9.024 | 200.317383 | −4496.644043 | 0.001132943 | −0.605115426 |
| 9.032 | 200.134277 | −4503.021484 | −3.35333E−08 | −0.005115462 |
| 9.04 | 200.317383 | −4497.013184 | 0.001350391 | −0.003765071 |
| 9.048 | 200.317383 | −4500.01709 | 0.00094987 | −0.002815201 |
| 9.056 | 200.317383 | −4499.158691 | 0.001064324 | −0.001750877 |
| 9.064 | 200.317383 | −4502.591797 | 0.000608576 | −0.001144301 |
| 9.072 | 200.500488 | −4510.05957 | 0.000160188 | −0.000984113 |
| 9.08 | 200.317383 | −4508.500098 | −0.000194531 | −0.001178644 |
| 9.088 | 200.317383 | −4508.085449 | −0.000125911 | −0.001304555 |
| 9.096 | 200.500488 | −4503.107422 | 0.001087141 | −0.000217413 |
| 9.104 | 200.317383 | −4506.540527 | 3.00787E−05 | −0.000137335 |
| 9.112 | 200.317383 | −4514.093262 | −0.000926953 | −0.001064287 |
| 9.12 | 200.317383 | −4503.32207 | 0.000469206 | −0.000595081 |
| 9.128 | 199.951172 | −4509.029297 | −0.00135039 | −0.001945471 |
| 9.136 | 200.134277 | −4506.797852 | −0.000503549 | −0.002449021 |
| 9.144 | 200.317383 | −4501.305273 | 0.000698113 | −0.001750908 |
| 9.152 | 200.134277 | −4510.746094 | −0.00529982 | −0.002780889 |
| 9.16 | 199.951172 | −4504.995605 | −0.000812565 | −0.003593454 |
| 9.168 | 200.317383 | −4501.476563 | 0.0007555274 | −0.00283618 |
| 9.176 | 199.961172 | −4506.540627 | −0.00518554 | −0.003856734 |
| 9.184 | 200.317383 | −4506.368652 | −0.00052995 | −0.003753739 |
| 9.192 | 200.500488 | −4497.356445 | 0.001853938 | −0.001899801 |
| 9.2 | 200.317383 | −4496.369434 | 0.001396224 | −0.000503577 |
| 9.208 | 200.500488 | −4507.913574 | 0.000446321 | −5.72558E−05 |
| 9.216 | 200.317383 | −4498.042969 | 0.001213086 | 0.001155831 |
| 9.224 | 200.317383 | −4512.033203 | −0.000652278 | 0.000503553 |
| 9.232 | 200.134277 | −4521.131636 | −0.002414747 | −0.001911195 |
| 9.24 | 200.500488 | −4509.887695 | 0.000183105 | −0.00172809 |
| 9.248 | 200.317383 | −4513.921875 | −0.00090451 | −0.002632191 |
| 9.256 | 200.317383 | −4504.460469 | 0.000354753 | −0.002277438 |
| 9.264 | 200.500488 | −4502.935547 | 0.001158 | −0.00116738 |
| 9.272 | 200.134277 | −4506.171387 | −0.000686687 | −0.001654067 |

In step S3, analyzing an error cause may comprise: analyzing and determining an error cause according to a graphic form of the thread error curve.

Figure 3:
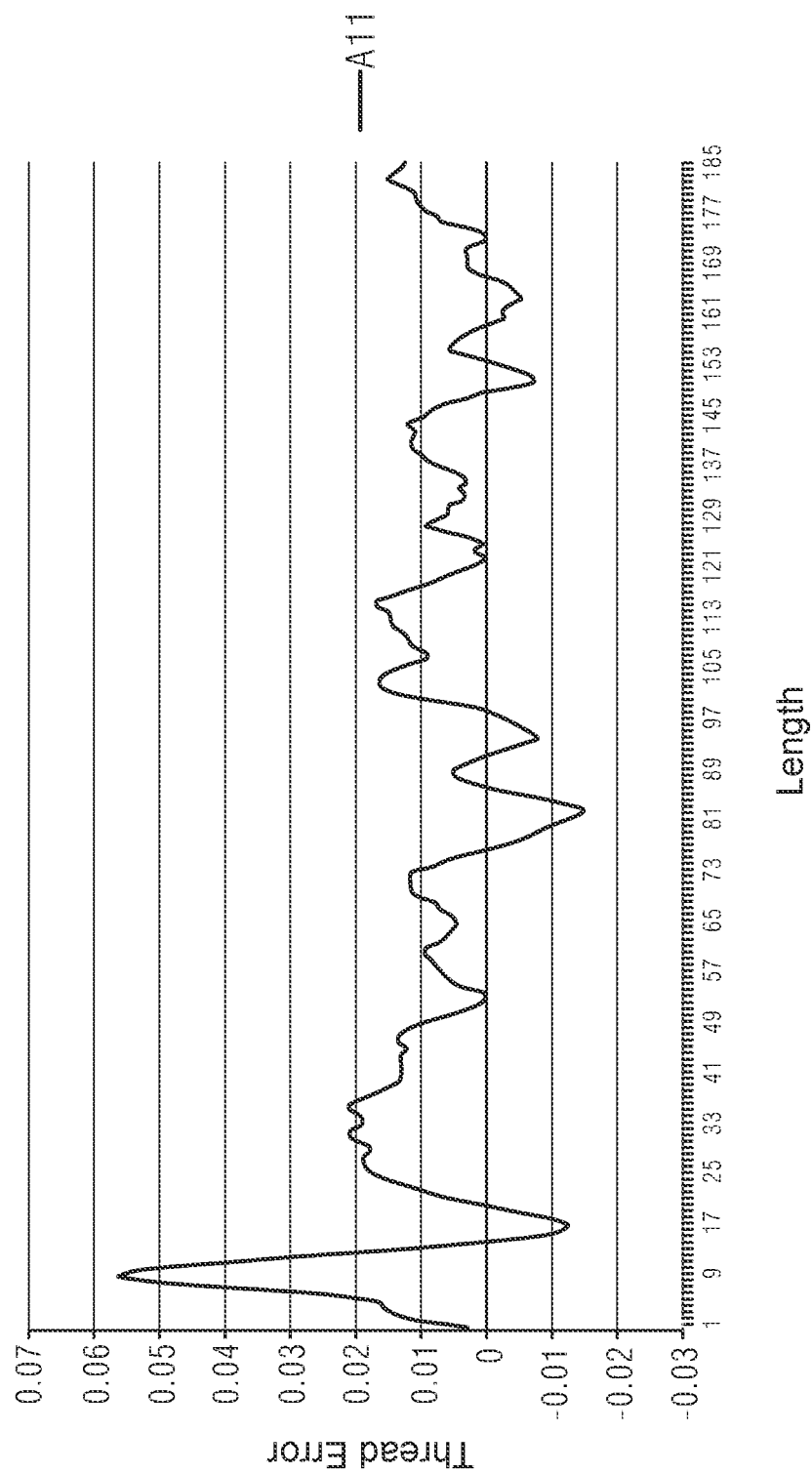
FIG. 3 shows an embodiment of a thread error curve.
Figure 4:
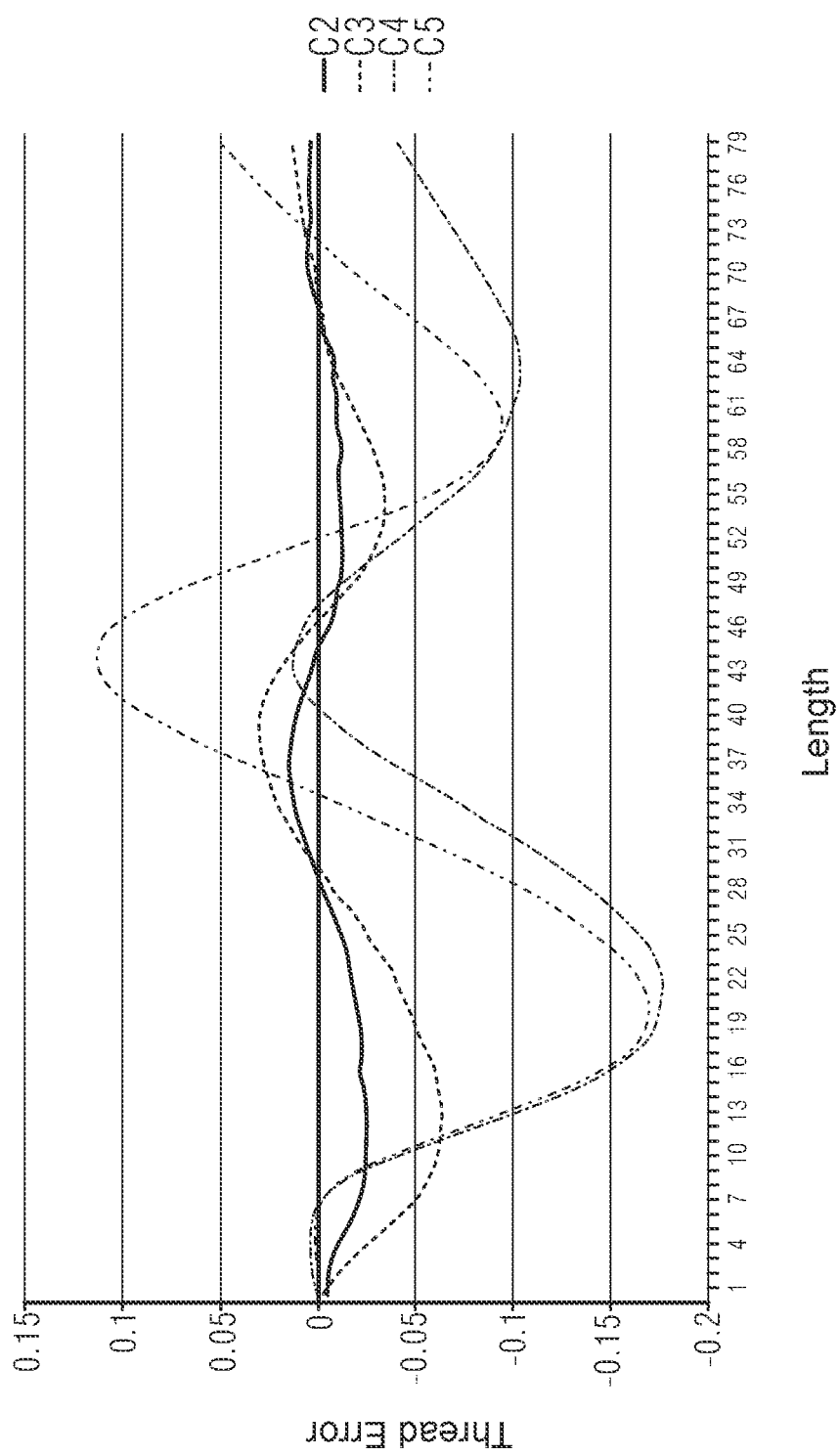
FIG. 4 shows another embodiment of a thread error curve.

For example, FIGS. 3 and 4 show two examples of the thread error curve. In FIGS. 3 and 4, the horizontal axis represents position on the workpiece in the length direction, and the vertical axis represents the thread error computed according to the above method. FIG. 3 shows an example of a first graphic form of the thread error curve. A curve A11 corresponds to the first graphic form, i.e. fluctuation of a starting segment of the curve A11 (the first peak at the left side) is greater than the overall fluctuation of the curve. FIG. 4 shows an example of a second graphic form of the thread error curve. Curves C4 and C5 correspond to the second graphic form, i.e. the overall fluctuation of the two curves C4 and C5 is greater than a preset fluctuation range (e.g. curves C2 and C3).

Differences in the above graphic forms can characterize different problem causes.

For example, the error cause corresponding to the first graphic form is very likely to be that a machined thread depth value has been set too high. A solution to an error cause of this type may comprise: automatically implementing or prompting an increase in the number of times cutting is performed, and/or automatically implementing or prompting a reduction in the machined thread depth value. The solution may be displayed to the user or maintenance engineer as a prompt, e.g. via a display device on the machine tool. Alternatively, the solution may also be automatically carried out by the system.

For example, the error cause corresponding to the second graphic form is very likely to be that an optimization mode (e.g. the AST (Auto Servo Tuning) function provided in Siemens CNC equipment) has not been enabled. A solution to an error cause of this type may comprise: automatically implementing or prompting the activation of a shaft state optimization mode.

Although only two examples of graphic forms are given above, the present invention is not limited to this. The present invention may analyze graphic forms having different characteristics, and associate these graphic forms with error causes thereof, in order to diagnose and resolve more fault types for reference.

If the thread error curve obtained after implementing the above solution still does not conform to expectations, a textual or graphic prompt may be issued to the engineer via the display device on the machine tool or via another known device, to seek more in-depth analysis. Alternatively, the above thread error curves may be presented together, to aid in the engineer in performing a diagnosis.

Furthermore, each instance of the present invention may be realized by means of a data processing program executed by a data processing device such as a computer. Obviously, the data processing program constitutes the present invention. In addition, a data processing program generally stored in a storage medium is executed by reading the program directly from the storage medium or by installing or copying the program to a storage device (e.g. a hard disk or internal memory) of the data processing device. Thus, such a storage medium also constitutes the present invention. The storage medium may use a recording method of any type, e.g. a paper storage medium (e.g. a paper strip, etc.), a magnetic storage medium (e.g. a floppy disk, hard disk, flash memory, etc.), an optical storage medium (e.g. CD-ROM, etc.) or a magneto-optical storage medium (e.g. MO, etc.), etc.

Thus, embodiments of the present invention further discloses a non-volatile storage medium, in which is stored a data processing program for executing any instance of the above embodiments of the method of the present invention.

Furthermore, the method steps of embodiments of the present invention may be realized not only using a data processing program, but also by hardware, e.g. by logic gates, switches, application-specific integrated circuits (ASIC), programmable logic controllers and embedded microcontrollers, etc. Thus, such hardware capable of realizing embodiments of the method of the present invention may also constitute the present invention.

Figure 5:
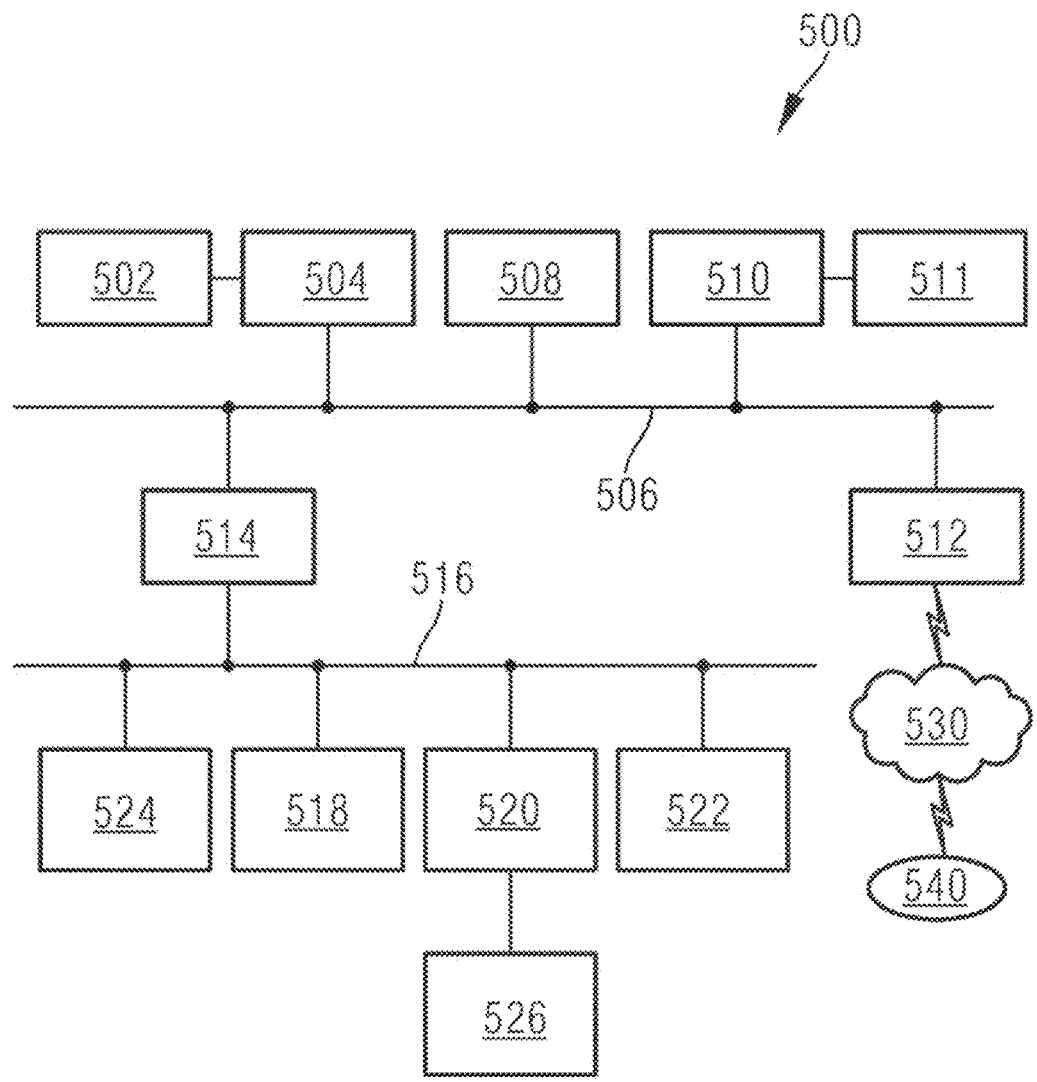
FIG. 5 shows a block diagram of a data processing system in which embodiments of the disclosed system and method may be implemented.

FIG. 5 depicts a block diagram of a data processing system in which embodiments of the disclosed system and method may be implemented. The data processing system depicted comprises a processor 502 connected to a Level 2 high-speed cache/bridge 504; the Level 2 high-speed cache/bridge 504 is in turn connected to a local system bus 506. The local system bus 506 may for example be a peripheral component interconnect (PCI) architecture bus. In the example depicted, a main memory 508 and a graphic adapter 510 are also connected to the local system bus. The graphic adapter 510 may be connected to a display device 511.

Another peripheral device (e.g. a local area network (LAN)/wide area network/wireless (e.g. WiFi) adapter 512) may also be connected to the local system bus 506. An expansion bus interface 514 connects the local system bus 506 to an input/output (I/O) bus 516. The I/O bus 516 is connected to a keyboard/mouse adapter 518, a magnetic disk controller 520 and an I/O adapter 522. The magnetic disk controller 520 may be connected to a storage device 526, which may be any suitable machine-usable or machine-readable storage medium, including but not limited to non-volatile, hard-coded type media (e.g. read-only memory (ROM) or electrically erasable programmable read-only memory (EEPROM) and magnetic tape storage devices) and user-recordable type media (e.g. floppy disk and hard disk drivers and compressed disk read-only memory (CD-ROM) or digital multi-functional disk (DVD)) and other known optical, electrical or magnetic memory devices.

In the example shown, an audio adapter 524 is also connected to the I/O bus 516; a loudspeaker (not shown) is connected to the audio adapter 524, for the purpose of broadcasting sound. The keyboard/mouse adapter 518 provides a connection for a pointing device (not shown); the pointing device is for example a mouse, trackball, tracking indicator, etc.

Those skilled in the art will recognize that the hardware depicted in FIG. 5 may change for specific embodiments. For example, another peripheral device (e.g. an optical disk driver, etc.) may also be additionally used in the depicted hardware or used instead of the depicted hardware. The depicted example is provided solely for the purpose of explanation, and does not mean that an architecture restriction relating to the present disclosure is implied.

The data processing system according to an embodiment of the present disclosure comprises an operating system using a graphical user interface. The operating system allows multiple display windows to be presented at the same time in the graphical user interface, wherein each display window provides an interface for a different application or a different instance of the same application. A cursor in the graphical user interface may be controlled by the user via a pointing device. The position of the cursor may be changed and/or an event such as a single click of a mouse button is generated to drive a desired response.

One of various commercial operating systems (e.g. a version of Microsoft Windows™, a product of the company Microsoft, located in Redmond, Wash.) may be used after suitable modification. The operating system is modified or created according to the present disclosure described.

The LAN/WAN/wireless adapter 512 may be connected to a network 530 (not part of the data processing system 500); as those skilled in the art already know, this may be any public or dedicated data processing system network or network combination, including the internet. The data processing system 500 may communicate with a server system 540 via the network 530; the server system 540 may also not be part of the data processing system 500, but may be implemented as a separate data processing system 500 for example.

In summary, the automatic diagnosis method and system for thread turning of the present invention make full use of available data in a CNC unit to diagnose the cause of a thread error, thereby improving production efficiency. In addition, the implementation of this technology does not require the addition of additional hardware equipment, e.g. sensors, etc., so the cost of implementation is low. Practical tests demonstrate that: the diagnostic precision of the automatic diagnosis method of embodiments of the present invention can reach and surpass 90%, thus it is possible to resolve most thread error faults, thereby improving the user experience.

It will be obvious to those skilled in the art that various modifications and changes may be made to the above demonstrative embodiments of the present invention without deviating from the spirit and scope of the present invention. Thus, it is intended that the present invention should cover modifications and changes to the present invention that fall within the scope of the attached claims and equivalent technical solutions thereof.

The invention claimed is:

1. An automatic diagnosis method for thread turning, comprising:
    setting thread pitch;
    acquiring a main shaft actual speed and a feed shaft actual speed of a lathe;
    continuously computing a thread error based upon the main shaft actual speed and the feed shaft actual speed, to obtain and display a thread error curve, the thread error is computed according to:

$$E\_thread=(V\_act.sp*L\_pitch-V\_act.feed)/(60*T\_ipo),$$

wherein E_thread denotes the thread error, V_act.sp denotes the main shaft actual speed, L_pitch denotes the set thread pitch, V_act.feed denotes the feed shaft actual speed, and T_ipo denotes a time period;
    analyzing an error cause according to the displayed thread error curve, wherein the thread error curve represents a position along a length of a workpiece and a deviation of the position in the set thread pitch on the workpiece during the time period;
    displaying the thread error curve; and
    automatically selecting and implementing a corresponding solution to the error cause.

2. The automatic diagnosis method for thread turning of claim 1, wherein the continuously computing of the thread error further comprises:
    computing a feed shaft theoretical speed based upon the main shaft actual speed, wherein the feed shaft theoretical speed is a theoretical speed that is required in order to obtain a required thread pitch; and
    computing the thread error by comparing the feed shaft actual speed with the feed shaft theoretical speed.

3. The automatic diagnosis method for thread turning of claim 2, wherein the main shaft actual speed and the feed shaft actual speed are acquired once at intervals of the time period, and wherein the feed shaft actual speed and the feed shaft theoretical speed obtained in a same acquisition are compared during the computing of the thread error.

4. The automatic diagnosis method for thread turning of claim 3, wherein the time period is in a range of 4 ms-12 ms.

5. The automatic diagnosis method for thread turning of claim 1, wherein the analyzing of the error cause comprises:
    analyzing and determining the error cause according to a graphic form of the thread error curve displayed on a display device on a machine tool.

6. The automatic diagnosis method for thread turning of claim 5, wherein the graphic form of the thread error curve comprises:
    a first graphic form, having a characteristic, where fluctuation of a starting segment in the thread error curve is relatively greater than overall fluctuation of the thread error curve; and
    a second graphic form, having a characteristic, where the overall fluctuation of the thread error curve is relatively greater than a set fluctuation range.

7. The automatic diagnosis method for thread turning of claim 6, wherein the error cause corresponding to the first graphic form is that a machined thread depth value is set too high, and the error cause corresponding to the second graphic form is that an optimization mode has not been enabled.

8. The automatic diagnosis method for thread turning of claim 7, further comprising, after the analyzing of the error cause:
    selecting and implementing the corresponding solution according to the error cause.

9. The automatic diagnosis method for thread turning of claim 8, wherein
    the solution for the error cause corresponding to the first graphic form comprises at least one of:
        automatically implementing or prompting an increase in a number of times cutting is performed, and
        automatically implementing or prompting a reduction in the machined thread depth value; and
    the solution for the error cause corresponding to the second graphic form comprises:
        automatically implementing or prompting activation of a shaft state optimization mode.

10. A non-transitory storage medium, storing one or more programs comprising an instruction which, when executed by a data processing system, causes the data processing system to execute the method of claim 1.

11. A non-transitory storage medium, storing one or more programs comprising an instruction which, when executed by a data processing system, causes the data processing system to execute the method of claim 2.

12. An automatic diagnosis system for thread turning, comprising:
    a data acquisition unit configured to acquire a main shaft actual speed and a feed shaft actual speed of a lathe;
    a data processing unit configured to continuously compute a thread error based upon the main shaft actual speed and the feed shaft actual speed from the data acquisition unit and to obtain and display a thread error curve, the thread error curve representing a position along a length of a workpiece and a deviation of the position in a set thread pitch on the workpiece during a time period; and
    a diagnosis unit, configured to analyze an error cause according to the thread error curve from the data processing unit, wherein the data processing unit is further configured to select and implement a corresponding solution to the error cause, wherein the thread error is computed according to:

$$E\_thread=(V\_act.sp*L\_pitch-V\_act.feed)/(60*T\_ipo),$$

wherein E_thread denotes the thread error, V_act.sp denotes the main shaft actual speed, L_pitch denotes the set thread pitch, V_act.feed denotes the feed shaft actual speed, and T_ipo denotes the time period.

13. The automatic diagnosis system for thread turning of claim 12, wherein the data processing unit is further configured to
    compute a feed shaft theoretical speed based upon the main shaft actual speed, and
    compute the thread error by comparing the feed shaft actual speed with the feed shaft theoretical speed.

14. The automatic diagnosis system for thread turning of claim 12, wherein the diagnosis unit is further configured to analyze and determine the error cause according to a graphic form of the displayed thread error curve.

15. A data processing system, comprising:
    one or more processors;
    a memory, one or more programs being stored in the memory and configured to be executed by the one or more processors, the one or more programs comprising an instruction for executing:
        acquiring a main shaft actual speed and a feed shaft actual speed of a lathe;
        continuously computing a thread error based upon the main shaft actual speed and the feed shaft actual speed, to obtain and display a thread error curve, the thread error curve is computed according to:

$$E\_thread=(V\_act.sp * L\_pitch - V\_act.feed)/(60 * T\_ipo),$$

wherein E_thread denotes the thread error, V_act.sp denotes the main shaft actual speed, L_pitch denotes set thread pitch, V_act.feed denotes the feed shaft actual speed, and T_ipo denotes a time period;

analyzing an error cause according to the displayed thread error curve, wherein the thread error curve represents a position along a length of a workpiece and a deviation of the position in the set thread pitch on the workpiece during the time period;

displaying the thread error curve; and automatically selecting and implementing a corresponding solution to the error cause.

16. The data processing system of claim 15, wherein the one or more programs further comprise the instruction for executing, wherein the instruction when executed by the one or more processors during the continuously computing of the thread error:

computing a feed shaft theoretical speed based upon the main shaft actual speed; and computing the thread error by comparing the feed shaft actual speed with the feed shaft theoretical speed.

* * * * *